United States Patent [19]

Engelskirchen et al.

[11] Patent Number: 5,286,346
[45] Date of Patent: Feb. 15, 1994

[54] DEINKING OF WASTEPAPER WITH QUATERNIZED HYDROXYETHYL CELLULOSE

[75] Inventors: Konrad Engelskirchen, Meerbusch; Herbert Fischer, Duesseldorf; Klaus Hornfeck, Mettmann; Doris Oberkobusch, Duesseldorf; Ludwig Schieferstein, Ratingen, all of Fed. Rep. of Germany

[73] Assignee: Henkel Kommanditgesellschaft auf Aktien, Duesseldorf, Fed. Rep. of Germany

[21] Appl. No.: 689,262

[22] PCT Filed: Nov. 14, 1988

[86] PCT No.: PCT/EP89/01364

§ 371 Date: May 23, 1991

§ 102(e) Date: May 23, 1991

[87] PCT Pub. No.: WO90/05806

PCT Pub. Date: May 31, 1990

[30] Foreign Application Priority Data

Nov. 23, 1988 [DE] Fed. Rep. of Germany ....... 3839478

[51] Int. Cl.$^5$ .............................................. D21C 5/02
[52] U.S. Cl. .......................................... 162/8; 162/5
[58] Field of Search ....................................... 162/5, 8

[56] References Cited

U.S. PATENT DOCUMENTS

| | | | |
|---|---|---|---|
| 3,472,840 | 10/1969 | Stone et al. | 8/188 |
| 3,846,227 | 11/1974 | Mestetsky et al. | 162/8 |
| 4,710,267 | 12/1987 | Elshy et al. | 162/8 |
| 4,871,424 | 10/1989 | Dreisbach et al. | 162/DIG. 4 |
| 4,971,656 | 11/1990 | Lehmann et al. | 162/8 |

FOREIGN PATENT DOCUMENTS

| | | | |
|---|---|---|---|
| 13027 | 7/1980 | European Pat. Off. | 162/5 |
| 172684 | 2/1986 | European Pat. Off. | |
| 3627407 | 2/1988 | Fed. Rep. of Germany | 162/5 |
| 223390 | 12/1984 | Japan | 162/5 |
| 2085088 | 4/1987 | Japan | 162/5 |
| 2178079 | 2/1987 | United Kingdom | 162/5 |

Primary Examiner—Karen M. Hastings
Attorney, Agent, or Firm—Ernest G. Szoke; Wayne C. Jaeschke; Real J. Grandmaison

[57] ABSTRACT

The invention relates to a process for deinking wastepaper in the presence of at least partly water-soluble polymers and/or copolymers containing amino and/or ammonium groups. Two examples of appropriate polymers/copolymers are neutralized polyethyleneimine and quaternized hydroxyethyl cellulose.

3 Claims, No Drawings

DEINKING OF WASTEPAPER WITH QUATERNIZED HYDROXYETHYL CELLULOSE

This invention relates to a process for deinking wastepaper and to the use of at least partly water soluble polymers containing amino and/or ammonium groups and having number average molecular weights in the range from 2,000 to 500,000 for the deinking of wastepaper printed with water-dilutable printing inks.

Today, wastepaper is used in large quantities for the production of, for example, newsprint and hygiene paper. Lightness and color are important quality features for papers of this type. To achieve this, the printing inks have to be removed from the printed wastepaper. This is normally done by deinking processes essentially comprising two steps, namely:

1. refining the wastepaper, i.e. fiberizing in water in the presence of the chemicals required for detachment of the printing ink particles and
2. removal of the detached printing ink particles from the fiber suspension.

The second step can be carried out by washing or flotation (Ullmanns Encyclopädie der technischen Chemie, 4th Edition, Vol. 17, pages 570-571 (1979)). In flotation, which utilizes the difference in wetability between printing inks and paper fibers, air is forced or dawn through the fiber suspension. Small air bubbles attach themselves to the printing ink particles and form a froth at the surface of the water which is removed by savers.

The deinking of wastepaper is normally carried out at alkaline pH values in the presence of alkali hydroxides, alkali silicates, oxidative bleaches and surfactants at temperatures in the range from 30 to 50° C. Soaps and/or fatty alcohol polyglycol ethers are often used as surfactants which are responsible for the detachment and separation of the printing inks (Ullmanns Encyclopädie der technischen Chemie 4th Edition, Vol. 17, pages 571-572 (1979)). It is known from DE-OS 15 17 148 that printing inks based on petroleum oils can be removed from wastepaper in the presence of proteins having molecular weights of, for example, 10,000 or with polyvinyl pyrrolidones. DE-OSS 33 22 330 and 33 47 906 describe the use of alkylaminopolyethers for the removal of printing ink. In addition, ethyleneimine/ethylene oxide/propylene oxide copolymers are known as deinking chemicals from JP 84/137 587, abstracted in Chem. Abstr. 102, 80638b (1985) while ethylene oxide/propylene oxide/alkyl(alkenyl)amine adducts are known as deinking chemicals from JP 82/25 489, abstracted in Chem. Abstr. 97, 57393n (1982).

In recent years, conventional printing ink systems, for example based on nitrocellulose, maleate resins and/or shellac, which contain esters and/or ketones, for example ethyl acetate and/or methyl ethyl ketone, or alcohols as solvent, have been increasingly replaced by water-dilutable printing inks for reasons of pollution control. Another reason for the increasing use of water-dilutable printing inks lies in the non-inflammability of water which eliminates the need for the expensive safety systems which normally have to be installed in the printing factories where solvent-containing printing inks are used. Most water-dilutable printing inks contain as binder component anionic polymers, for example polymers containing carboxyl groups, of which the neutralization with bases makes the printing inks dilutable with water.

However, water-dilutable printing inks have the major disadvantage that they can only be removed completely inadequately, if at all, with the surfactants typically present in the deinking liquor (Wochenblatt für Papierfabrikation 13, 537-538 (1988)). The result of this is that, hitherto, the wastepaper printed with water-dilutable printing inks, which is accumulating in ever-increasing quantities, is not recycled and, hence, is also not available as a wastepaper raw material for newsprint and hygiene papers.

Accordingly, the problem addressed by the present invention is to provide a deinking process by which it is possible to deink wastepaper containing constituents printed with water-dilutable printing inks.

It has now surprisingly been found that water-dilutable printing inks can be removed in wash deinking or flotation deinking processes in the presence of at least partly water-soluble polymers and/or copolymers containing amino and/or ammonium groups.

Accordingly the present invention relates to a process for deinking wastepaper which is characterized in that wastepaper printed with water-dilutable printing inks is refined in the presence of at least partly water-soluble polymers and/or copolymers containing amino and/or ammonium groups and having number average molecular weights in the range from 2,000 to 500,000 and the printing particles are subsequently removed from the fiber suspensions in known manner by flotation or washing.

The present invention also relates to the use of at least partly water-soluble polymers and/or copolymers containing amino and/or ammonium groups and having number average molecular weights in the range from 2,000 to 500,000 for deinking wastepaper printed with water-dilutable printing inks.

It is preferred to use at least partly water-soluble polymers and/or copolymers containing amino and/or ammonium groups and having number average molecular weights in the range from 5,000 to 200,000, those having number average molecular weights in the range from 10,000 to 100,000 being particularly preferred.

"At least partly water-soluble" means that more than 0.01% by weight of the polymers and/or copolymers forms clear or clouded solutions in water at the in-use pH value.

The expression "at least partly water-soluble polymers and/or copolymers containing amino groups" also encompasses polymers containing pyridine groups, for example polymers based on 2-vinyl pyridine and/or 4-vinyl pyridine.

A particularly preferred group of polymers for the process according to the invention are polyethyleneimines and/or copolymers containing ethyleneimines. They may optionally be used together with other at least partly water-soluble polymers and/or copolymers containing amino and/or ammonium groups and having number average molecular weights in the range from 2,000 to 500,000.

In addition, polymers and/or copolymers based on 2-vinyl pyridine, 4-vinyl pyridine and/or 1-vinyl imidazole for example poly-4-vinyl pyridine, copolymers of 1-vinyl imidazole and N-vinyl pyrrolidone containing from 10 to 90% by weight vinyl imidazole, optionally in combination with other at least partly water-soluble polymers and/or copolymers containing amino and/or ammonium groups and having number average molecular weights in the range from 2,000 to 500,000, are particularly suitable for the deinking of wastepaper. These polymers and/or copolymers are prepared by polymerization processes known per se, for example in bulk in the presence of - radical-forming substances (Ullmanns Encyclopädie der technischen Chemie, 4th Edition, Vol. 23, pages 611-614, Verlag Chemie Weinheim 1983).

Polysaccharides and/or heteropolysaccharides containing primary, secondary, tertiary and/or quaternary amino groups and/or derivatives thereof, which may optionally be used in combination with other at least partly water-soluble polymers and/or copolymers containing amino and/or ammonium groups and having number average molecular weights in the range from 2,000 to 500,000, are another particularly preferred group of polymers for the deinking process according to the invention. At least partly water-soluble celluloses, hydroxyethyl celluloses, starches, chitosan and/or guar containing primary, secondary, tertiary and/or quaternary amino groups are examples of polysaccharides and/or heteropolysaccharides containing primary, secondary, tertiary and/or quaternary amino groups. The introduction of tertiary and/or quaternary amino groups into polysaccharides and/or heteropolysaccharides free from amino groups is effected in known manner by reaction of polysaccharides and/or heteropolysaccharides with tertiary amines containing a glycidyl radical and/or with ammonium compounds (US 3,472,840). Dimethyl glycidyl amine and 3-chloro-2-hydroxypropyl trimethyl ammonium chloride are examples of tertiary amines and ammonium compounds.

In addition, water-dilutable printing inks can be removed particularly effectively from wastepaper in the presence of proteins, optionally in combination with other at least partly water-soluble polymers and/or copolymers containing amino and/or ammonium groups and having number average molecular weights in the range from 2,000 to 500,000.

Water-dilutable printing inks, for example water-dilutable flexo printing inks, may be removed from printed wastepaper, for example newspapers, magazines, computer paper, journals, brochures, forms, telephone directories and/or catalogues, in the presence of the polymers and/or copolymers mentioned above. The deinked wastepaper obtained is distinguished by very high degrees of whiteness.

The wastepaper to be deinked is refined at 20 to 60° C. in a pulper in an aqueous solution typically containing 0.5 to 1.0% by weight 100% hydrogen peroxide, 0.5 to 2.5% by weight 100% NaOH, 2.0 to 4.0% by weight waterglass, 35% by weight (37–40 Bé) and 0.01 to 1% by weight active substance of at least partly water-soluble polymer and/or copolymer containing amino and/or ammonium groups (all percentages by weight based on air-dry wastepaper). To obtain good deinking results, 0.01 to 1 g active substance of polymer and/or copolymer according to the invention is used per 100 g air-dry wastepaper. After a residence time of 60 to 120 minutes at temperatures in the range from 20 to 60° C., the fiber suspensions are stirred into water so that 0.6 to 1.6% by weight pulp suspensions are obtained. The suspensions are then floated, preferably by methods known per se, for example in a Denver flotation cell.

EXAMPLES

Application Examples 98 g air dry (=90 g bone-dry for 8% moisture) printed wastepaper of 100% newspapers printed with water-dilutable flexs printing inks were refined at a pulp density of 3.5% by weight in a laboratory pulper using aqueous solutions consisting of 2% by weight soda waterglass, 37 - 40 Bé
1% by weight sodium hydroxide (100%)
0.7% by weight hydrogen peroxide (100% by weight)
0.4% by weight surfactant or 0.2% by weight polymer or copolymer according to the invention at a temperature of 45° C. by means of a dispersion disk (3,000 revolutions per-minute). and, after 1.75, h at 45° C., were diluted to 1% by weight by stirring the fiber suspenpaper, sions into water. The fiber suspensions were then floated for 15 minutes at 1,900 r.p.m. in a Denver flotation cell.

The deinking results of the deinked wastepaper obtained in the presence of various polymers and copolymers and in the presence of surfactants are shown in Table 1. The deinkability value (DEM) was calculated from the reflection factors $R_{457nm}$ (whiteness) of the printed (BS), deinked (DS) and unprinted (US) paper stock in accordance with the following formula:

$$DEM(\%) = \frac{\text{whiteness }(DS) - \text{whiteness }(BS)}{\text{whiteness }(US) - \text{whiteness }(BS)} \times 100$$

(0% means no deinking, 100% means quantitative deinking).

TABLE 1

| Polymer used | $R_{457}$ (BS) | $R_{457}$ (DS) | DEM (%) | Appearance of the recycle water |
|---|---|---|---|---|
| Superfloc ® C577[1] | 36.3 | 47.8 | 57 | Clear |
| Polymer JR ® 400[2] | 36.3 | 51.0 | 73 | Clear |
| For comparison | | | | |
| Fatty acid[3] | 36.3 | 35.6 | 0 | Black |

[1] Neutralized polyethyleneimine - 50% by weight aqueous solution, average molecular weight (MW) = 100,000, Brookfield viscosity (25° C., 20 r.p.m.): 300 mPa.s; manufacturer: Cyanamid (USA)
[2] Quaternized hydroxyethyl cellulose - quarternizing agent: 3-chloro-2-hydroxypropyl trimethyl ammonium chloride, degree of quaternization: 0.4/anhydroglucose unit; active substance content: 95%; manufacturer: Union Carbide
[3] Olinor ® 4010, Henkel KGaA

We claim:

1. A process for deinking wastepaper printed with water-dilutable printing ink, comprising fiberizing said wastepaper in an aqueous solution in the presence of an at least partly water-soluble polymer or copolymer comprising a quaternized hydroxyethyl cellulose having a number average molecular weight in the range of from about 2,000 to about 5000,000 in an amount effective to deink the wastepaper, and then removing the printing ink particles from the fiber suspension by flotation or washing.

2. A process as in claim 1 wherein said polymer or copolymer has a number average molecular weight in the range of from about 5,000 to about 200,000.

3. A process as in claim 1 wherein said polymer or copolymer has a number average molecular weight in the range of from about 10,000 to about 100,000.

* * * * *

UNITED STATES PATENT AND TRADEMARK OFFICE
CERTIFICATE OF CORRECTION

PATENT NO. : 5,286,346
DATED : February 15, 1994
INVENTOR(S) : Engelskirchen et. al.

It is certified that error appears in the above-indentified patent and that said Letters Patent is hereby corrected as shown below:

On the title page, item [22] PCT filed:
    The PCT date should read:
        -- Nov. 14, 1989 --.

Claim 1, column 4, line 55, "5000,000", should read:
        -- 500,000 --.

Signed and Sealed this

Twenty-fifth Day of April, 1995

Attest:

BRUCE LEHMAN

*Attesting Officer*      *Commissioner of Patents and Trademarks*